(12) United States Patent
Lindley et al.

(10) Patent No.: US 10,911,380 B2
(45) Date of Patent: Feb. 2, 2021

(54) AUTOMATED LARGE ATTACHMENT PROCESSING DURING MIGRATION

(71) Applicant: QUEST SOFTWARE INC., Aliso Viejo, CA (US)

(72) Inventors: Chad Lindley, Mount Horeb, WI (US); Stewart Nutter, Mount Horeb, WI (US); Jason Coyne, Middleton, WI (US)

(73) Assignee: QUEST SOFTWARE INC., Aliso Viejo, CA (US)

( * ) Notice: Subject to any disclaimer, the term of this patent is extended or adjusted under 35 U.S.C. 154(b) by 101 days.

(21) Appl. No.: 14/536,062

(22) Filed: Nov. 7, 2014

(65) Prior Publication Data
US 2016/0134571 A1 May 12, 2016

(51) Int. Cl.
*H04L 12/58* (2006.01)
*H04L 29/08* (2006.01)

(52) U.S. Cl.
CPC .......... *H04L 51/08* (2013.01); *H04L 67/1095* (2013.01)

(58) Field of Classification Search
CPC ...... H04L 51/08; H04L 67/1095; H04L 12/58
USPC ........................................................ 709/206
See application file for complete search history.

(56) References Cited

U.S. PATENT DOCUMENTS

| | | | | |
|---|---|---|---|---|
| 5,771,355 A | * | 6/1998 | Kuzma | G06Q 10/107 709/226 |
| 7,840,996 B1 | * | 11/2010 | Wu | H04L 63/0272 707/828 |
| 7,913,053 B1 | | 5/2011 | Newland | |
| 8,380,675 B1 | | 2/2013 | Dwivedi | |
| 9,235,641 B1 | | 1/2016 | Kumar | |
| 9,571,440 B2 | | 2/2017 | Appelman et al. | |
| 2004/0010543 A1 | * | 1/2004 | Grobman | G06F 17/30902 709/203 |
| 2005/0198511 A1 | * | 9/2005 | Tomkow | H04L 51/30 713/176 |
| 2007/0130255 A1 | * | 6/2007 | Wolovitz | H04L 12/5895 709/204 |

(Continued)

OTHER PUBLICATIONS

U.S. Appl. No. 14/645,129 Office Action dated Jun. 14, 2017.

*Primary Examiner* — Kevin T Bates
*Assistant Examiner* — Chen-Liang Huang
(74) *Attorney, Agent, or Firm* — Maschoff Brennan (57) ABSTRACT

A network-based solution for automatically processing large email attachments or other files during migration between email platforms or other platforms, as may be embodied by various systems, methods, and non-transitory computer-readable storage media, may involve downloading mailboxes from a source email platform and inspecting the mailboxes for emails containing attachment files. The solution may involve determining a file size of any detected attachment, comparing the file size of the detected attachment file to a predetermined attachment size limit, and uploading a copy of the detected attachment to a storage server for storage when the comparison determines that the file size of the detected attachment file exceeds the predetermined attachment size limit. The solution may further include modifying the email by replacing the detected attachment with a link to the copy of the detected attachment stored at the storage server and then migrating the modified email to the target email platform.

28 Claims, 4 Drawing Sheets

(56) References Cited

U.S. PATENT DOCUMENTS

| | | | |
|---|---|---|---|
| 2011/0022825 A1* | 1/2011 | Spackman | G06F 3/0608 |
| | | | 712/240 |
| 2011/0219200 A1 | 9/2011 | Xiao | |
| 2011/0264630 A1 | 10/2011 | Edelen | |
| 2012/0109898 A1 | 5/2012 | Baessler et al. | |
| 2012/0191671 A1* | 7/2012 | Kitamura | G06F 17/30156 |
| | | | 707/692 |
| 2012/0278405 A1* | 11/2012 | Costenaro | H04L 67/2857 |
| | | | 709/206 |
| 2013/0188864 A1* | 7/2013 | Moraleda | G06F 17/30247 |
| | | | 382/164 |
| 2013/0198459 A1* | 8/2013 | Joshi | G06F 12/084 |
| | | | 711/130 |
| 2013/0212200 A1* | 8/2013 | Dennis | H04L 51/22 |
| | | | 709/206 |
| 2013/0246901 A1* | 9/2013 | Massand | G06F 17/24 |
| | | | 715/229 |
| 2014/0180801 A1* | 6/2014 | Homsany | G06Q 30/0241 |
| | | | 705/14.49 |
| 2015/0095804 A1* | 4/2015 | Grossman | G06F 3/0482 |
| | | | 715/753 |
| 2015/0121063 A1* | 4/2015 | Maller | H04L 63/0435 |
| | | | 713/153 |
| 2015/0169599 A1* | 6/2015 | Burnett | H04L 51/08 |
| | | | 707/662 |
| 2016/0036833 A1* | 2/2016 | Ardeli | H04L 63/101 |
| | | | 726/22 |
| 2016/0099998 A1 | 4/2016 | Richman et al. | |
| 2016/0142350 A1 | 5/2016 | Mutha et al. | |
| 2016/0261584 A1 | 9/2016 | Dennis et al. | |
| 2016/0269329 A1 | 9/2016 | Willis | |
| 2016/0308812 A1 | 10/2016 | Johnstone | |

* cited by examiner

AUTOMATED LARGE ATTACHMENT PROCESSING DURING MIGRATION

BACKGROUND

Field of the Disclosure

The present disclosure concerns migrations between email platforms and other platforms (e.g., enterprise social networking platforms). More particularly, the present disclosure relates to migration between email platforms and other platforms and concerns a network-based solution for automatically processing large email attachments or other large files during migration.

Description of the Related Art

Today, businesses create, deliver, and receive email on an unprecedented level. Many businesses provide each employee with a personalized email account and dedicated mailbox within an enterprise email platform. As businesses continue to shift toward cloud-based or "hosted" email platforms such as Office 365 offered by Microsoft, Inc. (Redmond, Wash.), migrations between email platforms have become commonplace. And yet, such migrations continue to present a host of problems and difficulties. Given the sheer quantity and size of mailboxes and emails in use today, from small businesses with only a handful of registered email accounts to Fortune 500 companies with tens of thousands of registered accounts, businesses are struggling with the fact that migrating between email platforms can be expensive, time-consuming, tedious, and error-prone.

Although automated email migration solutions like OnDemand Migration for Email from Dell Software Inc. (Round Rock, Tex.) have provided businesses with significantly enhanced tools for automatically migrating between email platforms, one problem in particular has persisted in the industry—dealing with large email attachments. Modern day emails regularly include attachment files such as word processing documents, spreadsheets, or images. In some instances, attachments can carry massive file sizes (e.g., when attempting to send a high-resolution image or a massive data spreadsheet). Within the migration context, many hosted email platforms deal with large email attachments by enforcing a predetermined limit on the size of an attachment that may reside in the platform. While businesses face no shortage of options when selecting an email platform, not all platforms enforce the same attachment size limits. Office 365, for example, enforces an email attachment cap of 25 MB. Other email platforms enforce more liberal attachment limits of 30 MB or even 50 MB.

When two email platforms contain different attachment size limits, migrating between them presents a significant problem. Take, for example, the common scenario in which a business decides to migrate to Office 365 after using hypothetical "Source Platform" for many years. The attachment size limit for Source Platform may be 50 MB, while attachment size limit for Office 365 is only 25 MB. Having used Source Platform for many years, the business may have had thousands of its employees, each with their own dedicated mailbox, sending and receiving emails with attachments that were below Source Platform's 50 MB limit but will now violate Office 365's lower 25 MB limit. In this common scenario, the migration process will ultimately fail or—at best—be characterized by poor data fidelity as emails with attachments above 25 MB are lost or migrated without their attachments. Given these issues, businesses are unable to reliably preserve their data when migrating between certain hosted email platforms. This significant problem has persisted in the industry despite previously attempted solutions.

One inadequate approach is to identify large attachments in the source platform prior to migration and then either delete the attachments or manually move them to an alternate target platform to avoid causing failures during migration. That approach, however, requires significant manual effort and inevitably results in lost data due to human error or, at a minimum, a broken association between the attachment and the original message.

Another inadequate approach some have attempted involves reporting. During the migration, large attachments are identified and simply logged as errors for any instances in which the migration process fails to successfully transfer the attachments to the target platform. The reporting method suffers from many of the same limitations as the manual approach described above. At best, the reporting provides businesses with a method of tracking which files they must go back and manually migrate to another location. Notably, many solutions that leverage this approach also fail to offer any guidance on how to preserve data fidelity or maintain the association between the removed attachment and the original message.

Solutions like AttachThis and DropThis from Dell Software Inc. have proven useful for reducing the number of attachments maintained in an email platform, but they cannot be applied to automated migration processes. AttachThis and DropThis are add-ins for Microsoft Outlook that automatically upload email attachments to SharePoint, a hosted storage platform, rather than transmit them via email. The add-ins also insert a links that direct users to uploaded attachments stored in SharePoint. In addition to being unsuitable for use during migration between email platforms, AttachThis and DropThis require every individual email user to download and install the add-ins on his or her local client. As a result, the solutions are difficult to uniformly adopt or implement across an entire enterprise email platform. The same limitations significantly diminish the utility of a similar yet open-sourced mail filtering tool called MIMEDefang. In addition to being unsuitable for automated migration processes, MIMEDefang also lacks the security features and other functionality necessary to make it serviceable on an enterprise-level.

In addition to email platforms like those discussed above, other types of platforms, such as enterprise social networking platforms are also becoming increasingly popular. Two examples of popular enterprise social networking platforms include Jive offered by Jive Software (Palo Alto, Calif.) and Yammer offered by Yammer, Inc. (San Francisco, Calif.). The same problems discussed above apply equally with respect to these social networking platforms, which—like many hosted email platforms—enforce predetermined limitations on the size of files that may reside within the platform. Yammer, for instance, enforces a 50 MB limitation on file sizes.

Given the foregoing, businesses continue to need an easy-to-implement migration solution that offers enhanced data fidelity, provides reliable security, and is suitable for automatically handling large-scale platforms used by multiple employees on an enterprise-level scale.

SUMMARY OF THE CLAIMED INVENTION

A network based solution for automatically processing large email attachments or other large files during migration is disclosed.

In one claimed embodiment, a system for automatically processing large email attachments during migration may include a source email platform hosted by a first computing device. The source email platform may store a plurality of mailboxes and each mailbox may include a plurality of emails. The system may also include a target email platform hosted by a second computing device, a storage server, and an application server communicatively coupled to the source email platform, the target email platform, and the storage server by a network. The application server may have a predetermined attachment size limit and an executable application stored in memory. When executed by a processor of the application server, the application may download the mailboxes from the source email platform, inspect each downloaded mailbox for an email containing an attachment file, and determine a file size of a detected attachment file. The application may further compare the file size of the detected attachment file to the predetermined attachment size limit and upload a copy of the detected attachment to the storage server to be stored when the comparison determines that the file size of the detected attachment file exceeds the predetermined attachment size limit stored in memory. The application may then modify the email by replacing the detected attachment in the email with a link to the copy of the detected attachment stored at the storage server. Having modified the email, the application may then complete any additional conversions required for the email message to be accepted into the target and migrate the modified email to the target email platform.

In another claimed embodiment, a method for automatically processing large email attachments during migration may include downloading numerous mailboxes from a source email platform. The method may include inspecting each downloaded mailbox for an email containing an attachment file, determining a file size of any detected attachment file, and comparing the file size of the detected attachment file to a predetermined attachment size limit. The method may further include uploading a copy of the detected attachment to a storage server for storage when the comparison determines that the file size of the detected attachment file exceeds the predetermined attachment size limit. The method may also include modifying the email by replacing the detected attachment in the email with a link to the copy of the detected attachment stored at the storage server and then migrating the modified email to the target email platform.

In yet another claimed embodiment, a non-transitory computer-readable storage medium may store an executable computer program that, when executed by a processor, may perform the foregoing method for automatically processing large email attachments during migration.

DETAILED DESCRIPTION

A network-based solution for automatically processing large email attachments or other large files during migration is disclosed. Although the novel solution is illustrated in this disclosure by way of various exemplary systems and methods, it should be understood that the embodiments described herein are exemplary only and are in no way limiting. For instance, although the figures provided illustrate one illustrative embodiment as applied to migrations between email platforms, the solution also offers the same benefits with respect to migrations between other types of platforms, such as enterprise social networking platforms (e.g., from Jive to Yammer). Persons of ordinary skill in the art will readily recognize and appreciate that the present disclosure suggests many other possible embodiments in addition to those expressly described herein.

The network-based solution for automatically processing large email attachments or other large files during migration, as may be embodied by various systems, methods, and non-transitory computer-readable storage media, may involve downloading mailboxes from a source email platform and inspecting the mailboxes for emails containing attachment files. The solution may involve determining a file size of any detected attachment, comparing the file size of the detected attachment file to a predetermined attachment size limit, and uploading a copy of the detected attachment to a storage server for storage when the comparison determines that the file size of the detected attachment file exceeds the predetermined attachment size limit. The solution may further include modifying the email by replacing the detected attachment with a link to the copy of the detected attachment stored at the storage server and then migrating the modified email to the target email platform.

In another embodiment concerning migration from a source enterprise social networking platform to a target enterprise social networking platform, the network-based solution may involve downloading user profiles, business unit groups, or other organized compartments of data and inspecting the same for the presence of large files. The solution may involve determining a file size of any detected file, comparing the file size of the detected file to a predetermined file size limit, and uploading a copy of the detected file to a storage server for storage when the comparison determines that the size of the detected file exceeds the predetermined attachment size limit. The solution may further include modifying the user profile, business unit group, or other organized compartment of data designated for migration by replacing the detected file with a link to the copy of the detected file at the storage server and then migrating the modified user profile, business unit group, or other organization compartment of data to the target enterprise social networking platform.

The network-based solution described herein constitutes a significant advancement in the field of migration between email platforms and other platforms (e.g., social networking platforms), particularly with respect to enterprise-level migrations. As discussed below in further detail, the solution overcomes a persistent problem in the email industry by automatically processing large email attachments that, absent the solution, cannot be successfully migrated due to attachment limits inherent in a target email platform. The solution overcomes the same issues with respect to other types of platforms, as noted above. The solution not only ensures greater data fidelity during migration, but it also offers data security benefits and is easy to deploy and use. The solution is also suitable for use by multiple employees on an enterprise-level scale.

Figure 1:
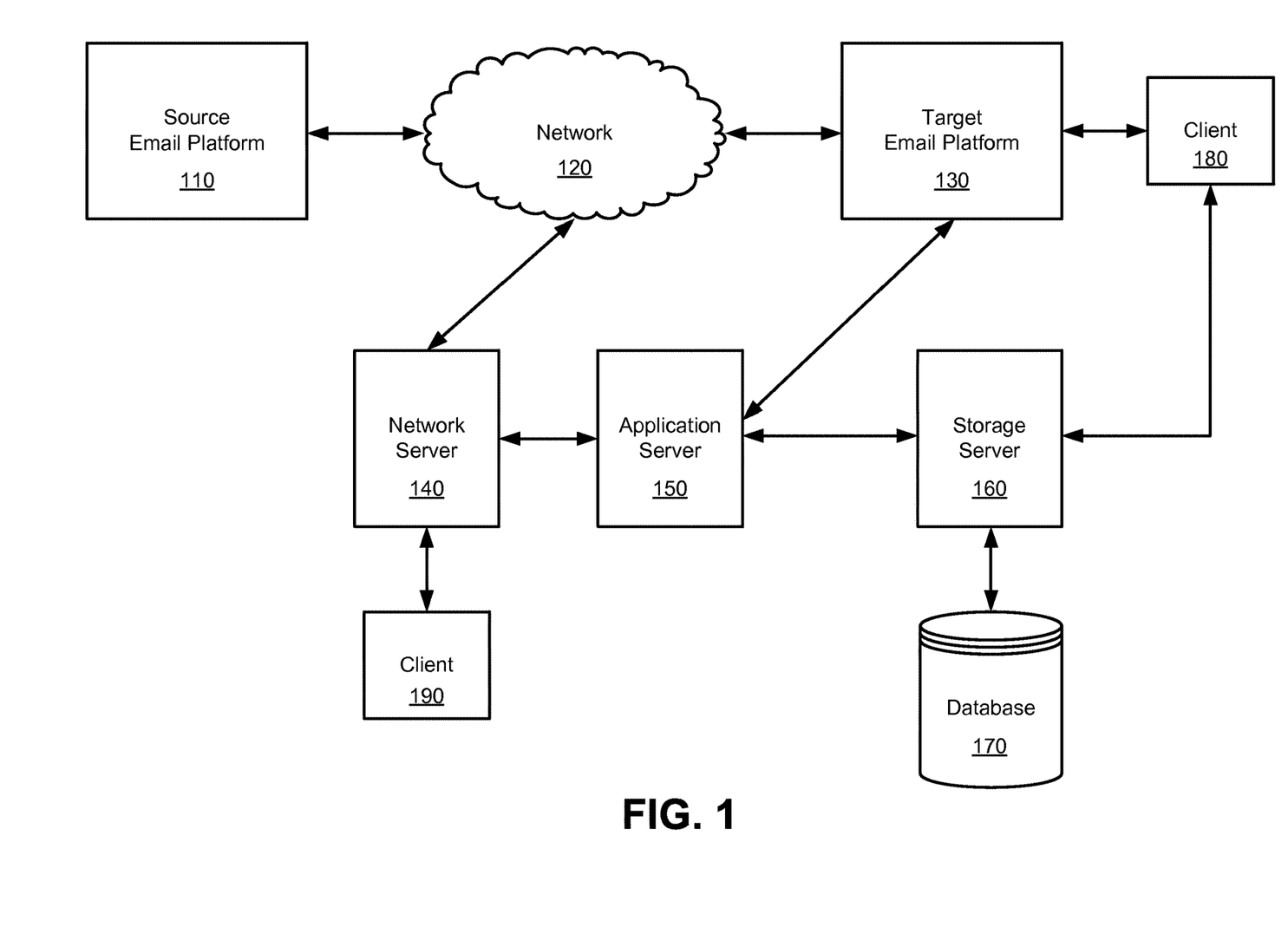
FIG. 1 is a block diagram of an exemplary environment in which a network-based solution for automatically processing large email attachments or other large files during migration may function.

FIG. 1 is a block diagram of an exemplary environment 100 in which a network-based solution for automatically processing large email attachments or other large files during migration may function. Although FIG. 1 is presented in the context of migration between email platforms, in alternative embodiments the network-based solution provides for automatic processing of large files during migration between other types of platforms, such as enterprise social networking applications. Accordingly, although the figures have been presented for the purpose of illustration, they should not be construed as limited to the precise forms disclosed. By way of an example, where FIG. 1 discusses a "source email platform" or "target email platform," it should be understood that the described embodiment is exemplary and that, in other possible embodiments, the structures described could alternatively be a source enterprise social networking platform and target enterprise social networking platform, respectively, or other types of platforms. Similarly, inspected "mailboxes" could, in other embodiments, be user profiles, posts, storage systems, and so forth that are inspected directly for large files.

As shown in FIG. 1, the environment may include a source email platform 110 communicatively coupled to a communications network 120. The source email platform 110 may be communicatively coupled to a target email platform 130 through network 120 and numerous intermediate computing devices, such as a network server 140. Network server 140 may be communicatively coupled to an application server 150. Application server 150 may be coupled to a storage server 160. Storage server 160 may host a shared, cloud-based file storage platform such as SharePoint or One Drive for Business. To that end, storage server 160 may include database 170 stored in memory. Alternatively, storage server 160 may be communicatively coupled to one or more separate and distinct database servers (not shown) maintaining database 170 and executable instructions associated with managing the database (e.g., performing lookups and, in some embodiment, generating secure HTML links to data files as discussed below). A client 180 may be communicatively coupled to both target platform 130 and storage server 160. Another client 190 may be communicatively coupled to network server 140 for the purpose of accessing the network-based solution hosted by application server 150. Some or all of the foregoing devices may function together as a system over network 120.

Source email platform 110 and target email platform 130 may each be a cloud-based or hosted email system, some examples of which include Google Apps Gmail, SunONE/iPlanet, Novell GroupWise, Microsoft Exchange 2000/2003, Microsoft Exchange 2007,2010, Microsoft BPOS, Microsoft Live@edu, and Microsoft 365. Source platform 110 and target platform 130 may each include one or more computing devices, such as network servers and mail servers, communicatively coupled together to form a self-contained hosted email system.

Network 120 may be implemented as a private network, a public network, an intranet, the Internet, or any suitable combination of the foregoing. Although FIG. 1 illustrates certain computing devices communicatively coupled to network 120, i.e., source platform 110, target platform 130, and network server 140, persons of ordinary skill in the art will readily recognize and appreciate that all of the devices depicted in FIG. 1 may be communicatively coupled together through network 120 or a series of such networks.

Network server 140 may receive and respond to requests transmitted over network 120 between the various computing devices depicted in FIG. 1 (e.g., between client 190 and application server 150. Although network server 140 is depicted between client 190 and application server 150 in FIG. 1, persons of ordinary skill in the art will appreciate that the environment illustrated in FIG. 1 may in many cases include additional network servers between other computing devices and may implement a network service. In one embodiment, for example, network 120 may be the Internet and network server 140 may be a web server. In various possible embodiments, network server 120 and application server 140 may be incorporated into a single computing device or, alternatively, may function as standalone computing devices as illustrated in FIG. 1.

Application server 150 may communicate with multiple computing devices, including for example network server 140, target email platform 130, storage server 160, and client 190. Application server 150 may host and maintain an executable application in memory. When executed, the application may provide a network-based solution for automatically processing large email attachments during migration from source email platform 110 to target email platform 130. As noted above, network server 140 and application server 150 may be incorporated as a single computing device or, alternatively, they may function as standalone computing devices.

Storage server 160 may communicate with application server 150, database 170, and client 180. In some embodiments, storage server 160 may be incorporated into a single computing device with either or both of network server 140 and application server 150. Database 170 may store data, process data, and resolve queries received from storage server 160.

Clients 180 and 190 may each be a computing device, such as a desktop computer, workstation, laptop, smartphone, tablet, or other suitable computing device. Clients 180 and 190 may each be communicatively coupled to network 120 at a network interface and may each be coupled either directly to network 120 or through any number of intermediate network servers, gateways, or other suitable computing devices. Client 180 may include a locally stored, client email application and may be associated with an email user. The email user may be a standard user of source platform 110 and may be associated with a mailbox being migrated over network 120 from source platform 110 to target platform 130. Provided the benefit of the network-based solution described herein, client 180 may not only communicate with target platform 130 following migration, but also with storage server 160 as necessary to retrieve or otherwise access large email attachments that were automatically detected and migrated to storage server 160 by the application hosted on application server 150.

Client 190 may include a network browser application through which a user, such as a company's system administrator, may access network-based applications. The network browser may be a locally stored, client application such as Chrome, FireFox, Safari, Opera, or Internet Explorer. The network browser may permit an administrator to view content provided to client 190 by application server 150. In some embodiments, client 190 may be a mobile device and, rather than viewing content provided to client 190 with a network browser application, administrator may do so through a custom mobile application downloaded and locally installed on client 190. In any event, through a series of graphical user interfaces rendered and displayed at client 190, the administrator may communicate with application server 150 to configure, deploy, and monitor the executable application stored in memory of application server 150. Notably, in some instances, client 180 and 190 may be the same computing device, just as the administrator may be both an administrator and a user of source email platform 110.

Figure 2:
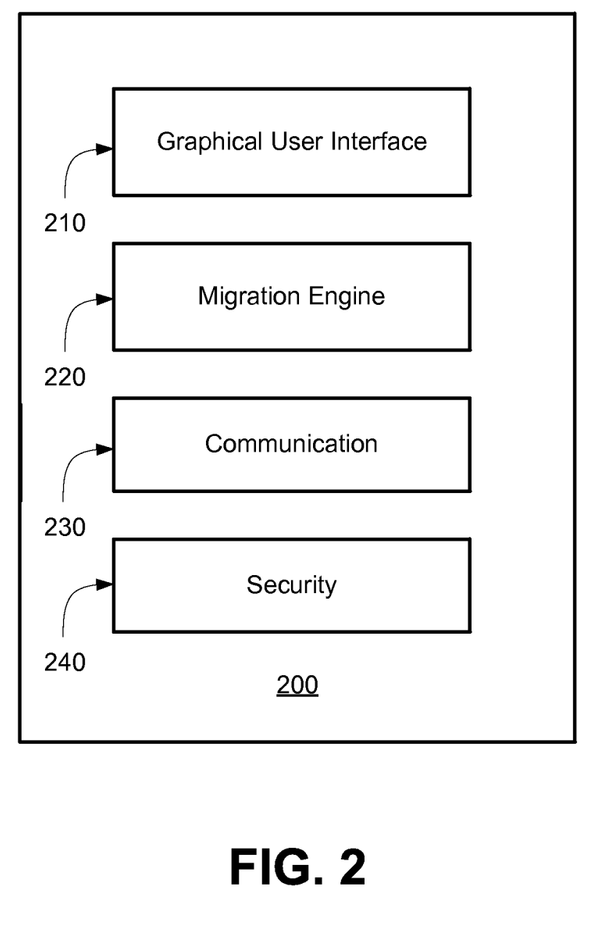
FIG. 2 is a block diagram of an exemplary application.

FIG. 2 is a block diagram of an exemplary application 200 stored in memory of application server 150. Application 200 may include a plurality of objects or modules, each of which may be responsible for effectuating one or more functionalities that contribute to the provision of a network-based solution for automatically processing large email attachments during migration. Each module may include a data model associated with a particular functionality and executable computer instructions that, when executed, effectuate the functionality.

As shown in FIG. 2, application 200 may include a graphical user interface module 210, a migration engine 220, a communication module 230, and a security module 240. Graphical user interface module may include executable instructions that, when executed by a processor of application server 150, effectuate functionality concerning the render and display of a series of graphical user interfaces on clients 180 or 190. Migration engine 220 may include executable instructions that, when executed by a processor of application server 150, effectuate functionality concerning the automatic detection, processing, and migration of large email attachments originating from source platform 110. Communication module 230 may include executable instructions that, when executed by a processor of application server 150, effectuate functionality concerning communications between application server 150 and other computing devices in the exemplary environment depicted in FIG. 1 (e.g., network server 140, target email platform 130, and storage server 160). Security module 240 may include executable instructions that, when executed by a processor of application server 150, effectuate functionality concerning the generation of scrambled or otherwise secure HTML links that provide users direct access to attachments migrated to storage server 160 as discussed below in further detail. Persons of ordinary skill in the art will readily recognize that the foregoing modules, including migration engine 220, are exemplary in nature and that application 200 may include any number of other modules depending on the anticipated structure of the environment depicted in FIG. 1. Moreover, although exemplary modules have been illustrated as distinct from another, persons of ordinary skill in the art will appreciate that various modules may alternatively be combined. For instance, the functionalities effectuated by communication module 230 and security module 240 may, in some embodiments, be integrated into migration engine 220.

Figure 3:
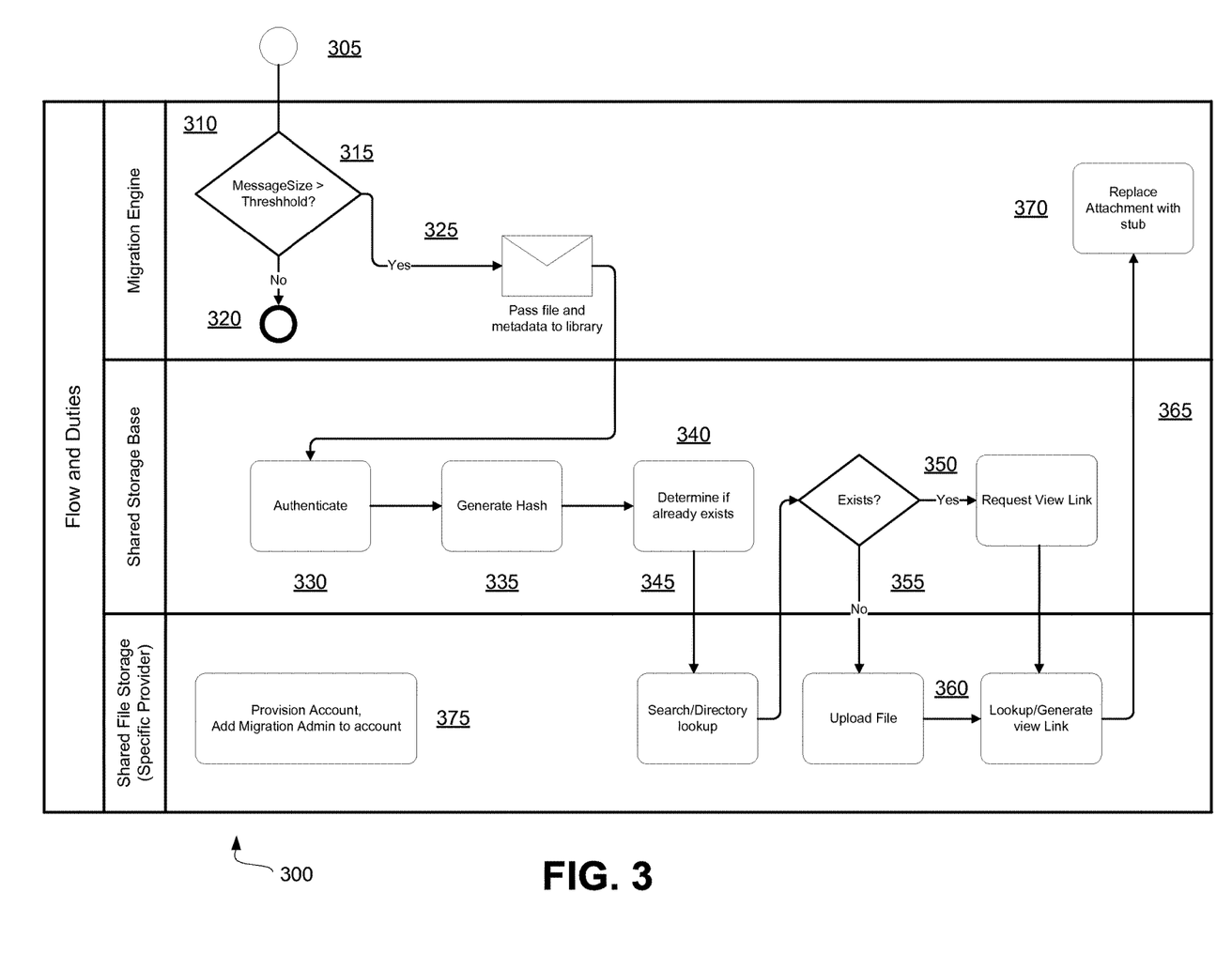
FIG. 3 is a flow diagram of an exemplary method for automatically processing large email attachments or other large files during migration.

FIG. 3 is a flow diagram of an exemplary method 300 for automatically processing large email attachments or other large files during migration. Exemplary method 300 may be carried out in the context of the environment depicted in FIG. 1 and the exemplary application depicted in FIG. 2.

At block 305, application server 150 may receive from client 190 a plurality of information concerning source email platform 110 and target email platform 130. Application server 150 may receive, for instance, an identification of the server type characterizing source platform 110 (e.g., Microsoft Exchange 2010) and target platform 130 (e.g., Office 365). Application server 150 may also receive domain address information, information concerning any applicable consumer keys and secrets (which may be obtained directly from the respective email platforms by the administrator in many cases), server name information, and a plurality of administrative login credentials for each email platform (e.g., an admin user name and password).

At block 305, application server 150 may also receive an identification of the mailboxes hosted by source platform 110 that the network-based solution should migrate to target platform 130. Application server 150 may receive the identification in any number of suitable ways, including for example receiving and reading a character-separated values (CSV) file submitted by the administrator at client 190. Alternatively, application server 150 may receive the identification of mailboxes to be migrated through a free-form data entry field presented within a graphical user interface rendered and displayed at client 190.

At block 310, a processor of application server 150 may execute migration engine 220 depicted in application 200 of FIG. 2. Upon execution of migration engine 220, migration engine 220 may use the received administrator login credentials to log into or otherwise access source email platform 110 and download the plurality of mailboxes designated for migration in the identification received at block 305.

At block 315, upon receiving each mailbox designated for migration, migration engine 220 may inspect the mailbox for emails containing attachment files. In one embodiment, migration engine 200 may inspect the mailboxes on a rolling basis as the mailboxes are received from source email platform 110. Employing such an embodiment may be advantageous where the volume of mailboxes designated for migration is high. In other embodiments, migration engine may wait until all of the designated mailboxes have been successfully downloaded before beginning the inspection step.

When migration engine 200 detects an email with an attachment while inspecting a mailbox, migration engine 200 may determine the file size of the attachment by reading metadata associated with the email. At block 315, migration engine 200 may compare the file size of the attachment to a predetermine threshold for attachment sizes. The predetermined threshold may be governed by the predetermined attachment size limit associated with target email platform 130. In a scenario in which target email platform 130 is Office 365, for instance, the predetermined threshold to which migration engine 200 compares the file size of any attachments detected during the inspection process may be equal to the 25 MB attachment size limit that is prebuilt into Office 365. The predetermined threshold may alternatively be set to a size limit even lower than the actual predetermined attachment size limit of target email platform 130.

As illustrated at block 320, when the comparison of the size of an attachment detected during the inspection process to the predetermined threshold determines that the attachment size does not exceed the threshold, migration engine 200 takes no further action with respect to the attachment. In such cases, the email bearing an acceptably sized attachment is ultimately migrated to target email platform 130 with its attachment left in place.

Conversely, at block 325, when the comparison determines that the attachment size exceeds the predetermined threshold, migration engine 200 may upload or otherwise transmit the attachment to storage server 160. Storage server 160 may then securely store the attachment in database 170. Migration engine 200 may then replace the attachment with a "stub" file containing a direct link to the secure attachment stored in database 170 (e.g., an HTML link containing a Universal Naming Convention (UNC) path). The stub may be a word processing document (e.g., a Microsoft Word document) or other file type suitable for transmitting a selectable HTML link that directs users to a platform hosted by storage server 160 in which the replaced attachment is securely stored. Where the stub is a word processing document or other text-based document, the stub file may contain helpful explanatory text in addition to the HTML link. For instance, the stub may be include a custom description of why the original attachment was stripped from the migrated email in addition to including the HTML link itself.

As illustrated at blocks 325 through 370, replacing the attachment with a stub may include a plurality of substeps. As shown at block 330, replacing the attachment with a stub may include authenticating the file. As shown in the exemplary embodiment of FIG. 3, storage server 160—referred to in FIG. 3 as the "shared storage base"—may perform the authentication after receiving the attachment and associated metadata from application server 150.

At block 335, replacing the attachment may further include generating a hash to be associated with the attachment. In some embodiments, like that shown in FIG. 3, storage server 160 may generate the hash and may use the hash to generate a secure view link. A view link may be an anonymous, unidentifiable, or otherwise secure HTML link containing a UNC path that permits a user of client 180 to read the attachment without providing the user with write or edit permissions. Application server 150 then receives the secure view link and uses it to create a stub file as discussed further below. In other embodiments, application server 150 or a separate computing device may directly create the view link. In such cases, application server 150 may execute security module 240. Security module 240 may, upon execution by a processor of application server 150, create a uniquely scrambled or otherwise secure link by applying hash functions, globally unique identifier (GUID) generation algorithms, a combination of the foregoing, or any other suitable encryption mechanisms.

As depicted at block 340, replacing the attachment may further include determining whether the storage server 160 previously received an upload of the attachment from application server 150. Storage server 160 may do so by determining that the attachment already exists in database 170. At block 345, determining whether the attachment already exists in database 170 may include transmitting a lookup request to database 170 and evaluating a received response to the lookup request. In response to receiving the request for a view link from storage server 160, database 170 may perform a lookup to determine whether a view link was previously generated and stored for the attachment at issue. When the determination indicates that the attachment already exists, as shown at block 350, storage server 160 (or, in some embodiments, migration server 200) may refrain from uploading the attachment to storage 160 to avoid spending time and computing resources processing duplicative attachments. Instead, storage server 160 may receive a copy of the view link previously generated for the originally uploaded copy of the attachment. Storage server 160 may then transmit the previously generated view link to application server 150.

In some embodiments, database 170 may be incorporated into storage server 160 as illustrated in FIG. 1. In such cases, storage server 160 may include executable instructions associated with database 170 that, when executed, generate the secure view link. In other embodiments, database 170 may be stored in memory of a distinct computing device communicatively coupled to storage server 160, such as a distinct database, and the distinct computing device may execute instructions that generate the secure view link. In some embodiments, for example in those in which database 170 is stored in memory of a computing device distinct from storage server 60, the computing device storing database 170 may transmit the generated view link directly to application server 150. Persons of ordinary skill in the art will readily recognize that the distribution of functionalities and duties depicted in FIGS. 1-3 and described herein are merely exemplary in nature and that the present disclosure suggests a wide variety of other possible distributions.

When the lookup indicates that storage server 160 did not previously generate a view link, as illustrated at block 360, storage server 160 may proceed with generating a new view link and may transmit the view link to migration engine 200 of application server 150. In some embodiments, storage server 160 may also upload the attachment to database 170 (for instance, where database 170 is stored in a distinct computing device as discussed above) as shown at block 355. Depending on the embodiment, storage server 160 may generate the new view link or a separate computing device maintaining database 170 may do so. Upon receiving the view link from storage server 160 at block 365, migration engine 200 may create a stub file, insert the view link into the stub, and replace the attachment with the stub at block 370. Migration engine 200 may then transmit the modified or "stubbed" email to target email platform 130 where client 180 may access the email in stubbed form.

When migration engine 200 receives a previously generated view link from storage server 160 in response to a lookup performed at database 170, it may create the stub, insert the previously generated view link into the stub, and replace the attachment with the stub as described above.

In some instances, in lieu of a view link that effectively directs the user of client 180 to a read-only version of the attachment removed from the email and stored in storage server 160, migration engine 200 may insert a link to a version of the attachment that permits full read and write privileges. The view link method, however, provides an added layer of security by ensuring that migrated email attachments retain their association with the original document rather than becoming associated with an edited version that may not accurately reflect what was migrated. In embodiments utilizing view links, the network-based solution for processing large attachments during migration may offer even greater data fidelity.

At block 375, storage server 160 may provision a new user account within the shared storage platform hosted by storage server 160 (or by a distinct computing device storing database 170, where applicable) for the user of client 180. As a result, the user of client 180 may appropriately access the attachment preserved in the shared storage platform of storage server 160. To ensure that the administrator at client 190 may appropriately manage the migration process, storage server 160 may add the administrator to the new account. Where storage server 160 determines that the user of client 180 is already associated with a registered account for the shared storage platform, storage server 160 may simply grant the existing account access to any uploaded attachments originating from emails within a migrated mailbox associated with that particular user.

Following the above process, migration engine 200 may complete the migration process for the email at issue by transmitting the stubbed email to client 180. The user of client 180 may then access the stubbed email at client 180. Upon selecting the secure view link contained in the attached stub (and reading any accompanying explanatory text), the user may be directed to the original attachment as preserved within the shared storage platform hosted by storage server 160, which as illustrated in FIG. 1 may include database 170.

In some embodiments, application server 150 may upload to storage server 160 a separate copy of the attachment for each recipient in an address list of a migrated email. In other embodiments, application server 200 may upload a single copy of the attachment to hosted server 160. In such cases, application server 150, storage server 160, or a combination of the foregoing may actively manage ownership and rights information so as to provide each recipient in the address list of the migrated email appropriate access to the single attachment file.

As is clear from the above description, a network-based solution for automatically processing large email attachments during migration, as may be embodied by various systems and methods, has been disclosed. The foregoing methods may be performed by an executable computer program (e.g. application 200 of FIG. 2) embodied on a non-transitory computer-readable storage medium.

Figure 4:
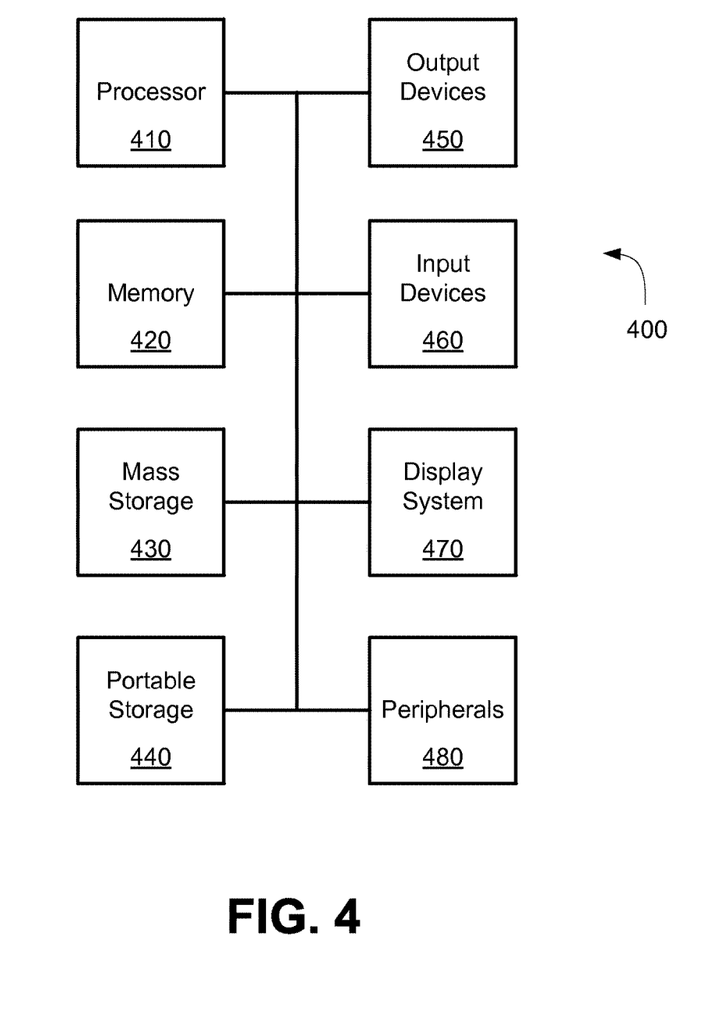
FIG. 4 is a block diagram of an exemplary system for implementing a computing device.

FIG. 4 is a block diagram of an exemplary system for implementing a computing device. The system 400 of FIG. 4 may be implemented in the context of clients 180 and 190, communication network 120, network server 140, application server 150, storage server 160, and database 170 of FIG. 1. The computing system of FIG. 4 may include one or more processors 410 and memory 420. Main memory 420 may store, in part, instructions and data for execution by processor 410. Main memory 420 may store the executable code when in operation. Computing system 400 may further include a mass storage device 430, a portable storage medium drive 440, output devices 450, user input devices 460, a graphics display system 470, and peripheral devices 480.

The components shown in FIG. 4 are depicted as being connected via a single bus 490. The components may alternatively be connected through one or more data transport means. Processor 410 and main memory 420, for example, may be connected via a local microprocessor bus. Mass storage device 430, peripheral device(s) 480, portable storage device 440, and display system 470 may be connected via one or more input/output buses.

Mass storage device 430, which may be implemented with a magnetic disk drive or an optical disk drive, may be a non-volatile storage device for storing data and instructions for use by processor 410. Mass storage device 430 may store system software for implementing embodiments of the network-based solution described herein for purposes of loading the software into main memory 420.

Portable storage device 440 may operate in conjunction with a portable non-volatile storage medium, such as a compact disk or digital video disc, to input and output data and code to and from computer system 400. The system software for implementing embodiments of the present network-based solution may be stored on such a portable medium and input to computer system 400 via portable storage device 440.

Input devices 460 may provide a portion of a user interface. Input devices 460 may include an alpha-numeric keypad, such as a keyboard, touch screen, or touchpad, for inputting alpha-numeric and other information, or a pointing device, such as a mouse, a trackball, stylus, or cursor direction keys. Additionally, system 400 may include output devices 450, such as speakers, printers, network interfaces, monitors, and the like.

Display system 470 may include a liquid crystal display or other suitable display device. Display system 470 may receive textual and graphical information and may process the information for output to the display device.

Peripherals 480 may include any type of computer support device to add additional functionality to computer system 400. Peripheral device 480 could be, for example, a modem or a router.

The components illustrated in computer system 400 of FIG. 4 are those typically found in computer systems that may be suitable for use with embodiments of the present network-based solution. The depiction of such components is not intended to be exhaustive in nature, but is rather intended to represent a broad category of computer components that are well known in the art. Thus, system 400 may be a desktop computer, workstation, server, mainframe computer, laptop, tablet, smartphone or other mobile or hand-held computing device, or any other suitable computing device. Computer system 400 may also include various bus configurations, networked platforms, multi-processor platforms, etc. Various operating systems may be used, such as Unix, Linux, Windows, Macintosh OS, Palm OS, and other suitable operating systems.

As explained above, the network-based solution described herein constitutes a novel, substantial, and meaningful improvement to the technical process of automated email migration between hosted email platforms. By automatically detecting impermissibly large email attachments during migration and replacing the attachments with permissibly sized stub files, the solution overcomes many of the migration failures plaguing migration processes today. By automatically inspecting every mailbox (or a designated subset of mailboxes) in a source platform, securely storing any detected email attachments over a particular size, and modifying the emails to avoid errors during migration, the solution provides feasible and practical utility for platforms with high volumes of users, including those used on enterprise-level scales. By uploading the original attachment file to a secure, shared storage platform and providing a link to the location of the stored attachment in the stub file, the solution significantly enhances data fidelity and permits users to quickly and reliably access attachments that would have otherwise been lost during a conventional migration process.

Moreover, by utilizing a word processing document format for the stub file, the solution permits an administrator to include explanatory text along with the link to the hosted file (e.g., a helpful introduction to the shared file storage platform hosted by the storage server). In doing so, the solution helps to avoid confusion that might otherwise be experienced by the email user upon opening a migrated email and discovering that an attachment is no longer present. The solution also provides enhanced security benefits by providing uniquely scrambled or otherwise secured links that cannot simply be guessed by trial and error or otherwise identified.

As noted above, although the foregoing description discusses migration between email platforms at length, in other embodiments the network-based solution provides for automatic processing of large files during migration between other types of platforms, such as enterprise social networking platforms (e.g., from Jive to Yammer). All of the benefits over the prior art provided by the solution and described above are equally applicable to such alternative embodiments. The foregoing detailed description has been presented for purposes of illustration and description. It is not intended to be exhaustive or to limit the technology to the precise form disclosed (e.g., only as applied to migrations between email platforms or other platforms, such as enterprise social networking platforms). Many modifications and variations are possible in light of the above teaching. The described embodiments were chosen in order to best explain the principles of the technology and its practical application to enable others skilled in the art to best utilize the technology in various embodiments and with various modifications as suited to the particular use contemplated. It is intended that the scope of the technology be defined by the claims appended hereto.

What is claimed is:

1. A system for automatically processing large email attachments during migration, the system comprising:
   a source email platform hosted by a first computing device, the source email platform storing a plurality of mailboxes, each mailbox including a plurality of emails, and the source email platform including a first attachment size limit stored in a first memory;
   a target email platform hosted by a second computing device;
   a storage server; and
   an application server communicatively coupled to the source email platform, the target email platform, and the storage server by a network, the application server having stored in a second memory a second attachment size limit and an executable application that, when executed by a processor of the application server:
      receives a first identification of a first server type characterizing the source email platform and a second identification of a second server type characterizing the target email platform;
      downloads the mailboxes from the source email platform;
      inspects each downloaded mailbox for an email containing an email attachment file, wherein the application server downloads and inspects the mailboxes on a rolling basis as the mailboxes are received from the source email platform;
      identifies a file size of a detected email attachment file;
      compares the file size of the detected email attachment file to the second attachment size limit stored in the second memory;
      determines whether a link has previously been generated for a copy of the detected email attachment file,
      wherein responsive to a determination that the link has previously been generated, no copy of the detected email attachment file is uploaded to the storage server, and
      wherein responsive to a determination that the link has not previously been generated and responsive to the comparison identifying that the file size of the detected email attachment file exceeds the second attachment size limit stored in the second memory, the application server generates the link, wherein the link permits read access of the detected email attachment file without write or edit permissions, wherein a copy of the detected email attachment file is uploaded to the storage server to be stored, wherein the link includes an HTML link containing a Universal Naming Convention (UNC) path that points to a location of the uploaded copy of the detected email attachment file stored in the storage server;
      modifies the email by replacing the detected email attachment file in the email with the link to the copy of the detected email attachment file stored at the storage server, wherein an activation of the link provides access to a read-only version of the detected email attachment file; and
      migrates the modified email to the target email platform, wherein the read-only version of the detected email attachment file retains an association to the detected email attachment file.

2. The system of claim 1, further including a database associated with the storage server, wherein the copy of the detected email attachment file is stored at the database.

3. The system of claim 1, wherein the storage server provisions a user account for each user associated with one of the mailboxes stored in the source email platform.

4. The system of claim 2, wherein an address list of the migrated email includes a plurality of recipients, and the upload of the copy of the detected email attachment file attached by the application server includes uploading a plurality of copies of the detected email attachment file to the storage server for each of the recipients listed in the address list of the migrated email.

5. The system of claim 2, wherein an address list of the migrated email includes a plurality of recipients, the application server uploads a single copy of the detected email attachment file to the storage server, and the storage server grants access to the plurality of recipients listed in an address list of the migrated email in accordance with certain predetermined permission information.

6. The system of claim 1, wherein the application server identifies the file size of the detected email attachment file by reading metadata associated with the email attachment file.

7. The system of claim 1, wherein the application server inspects the mailboxes after all of the mailboxes designated for download have been successfully received from the source email platform.

8. The system of claim 1, wherein the second attachment size limit is automatically determined by an attachment size limit built into the target email platform.

9. The system of claim 1, wherein the second attachment size limit is custom determined by an administrator.

10. The system of claim 1, wherein the application server replaces the detected email attachment file in the email with the link to the copy of the detected email attachment file stored at the storage server by authenticating the detected email attachment file.

11. The system of claim 10, wherein the application server replaces the detected email attachment file in the email with the link to the copy of the detected email attachment file stored at the storage server by further inserting the link into a stub file, removing the detected email attachment file, and attaching the stub file in place of the removed email attachment file.

12. The system of claim 11, wherein the stub file is a word processing document.

13. The system of claim 11, wherein the stub file further includes the link.

14. The system of claim 1, wherein the link is a view link that permits a user to read the uploaded copy of the detected email attachment file without permitting the user to write to or edit the copy of the detected email attachment file.

15. A method to process large email attachments during migration, the method comprising:
   downloading from a source email platform a plurality of mailboxes, each mailbox including a plurality of emails, and the source email platform including a first attachment size limit stored in a first memory; and
   executing instructions that are stored, wherein execution of the instructions:
   receives a first identification of a first server type characterizing the source email platform and a second identification of a second server type characterizing the target email platform;
   inspects each downloaded mailbox for an email containing an email attachment file, wherein the mailboxes are inspected on a rolling basis as the mailboxes are downloaded from the source email platform;

identifies a file size of a detected email attachment file;

compares the file size of the detected email attachment file to a second attachment size limit;

determines whether a link has previously been generated for a copy of the detected email attachment file,
wherein responsive to a determination that the link has previously been generated, no copy of the detected email attachment file is uploaded to a storage server, and
wherein execution of the instructions responsive to a determination that the link has not previously been generated and responsive to the comparison identifying that the file size of the detected email attachment file exceeds the second attachment size limit stored in a second memory, generates the link, wherein the link permits read access of the detected email attachment file without write or edit permissions, wherein a copy of the detected email attachment file is uploaded to the storage server to be stored, wherein the link includes an HTML link containing a Universal Naming Convention (UNC) path that points to a location of the uploaded copy of the detected email attachment file stored in the storage server;

modifies the email by replacing the detected email attachment file in the email with the link to the copy of the detected email attachment file stored at the storage server, wherein the link provides access to a read-only version of the detected email attachment file; and migrates the modified email to a target email platform, wherein the read-only version of the detected email attachment file retains an association to the detected email attachment file.

16. The method of claim 15, wherein an address list of the migrated email includes a plurality of recipients and the uploading of the copy of the detected email attachment file to the storage server includes a plurality of copies of the detected email attachment file to the storage server for each of the recipients listed in the address list of the migrated email.

17. The method of claim 15, wherein an address list of the migrated email includes a plurality of recipients, and the uploading of the copy of the detected email attachment file to the storage server includes uploading a single copy of the detected email attachment file to the storage server to be rights managed by the storage server with respect to access by the plurality of recipients according to predetermined permission information.

18. The method of claim 15, wherein identifying the file size of the detected email attachment file includes reading metadata associated with the email attachment file.

19. The method of claim 15, wherein the mailboxes are inspected after all of the mailboxes designated for download have been successfully received from the source email platform.

20. The method of claim 15, wherein the second attachment size limit is automatically determined by an attachment size limit built into the target email platform.

21. The method of claim 15, wherein the second attachment size limit is custom determined by an administrator.

22. The method of claim 15, wherein the replacing of the detected email attachment file in the email with the link to the copy of the detected email attachment file stored at the storage server includes generating a stub file.

23. The method of claim 22, wherein replacing the detected email attachment file in the email with the link to the copy of the detected email attachment file stored at the storage server further includes inserting the link into the stub file, removing the detected email attachment file, and attaching the stub file in place of the removed email attachment file.

24. The method of claim 22, wherein the stub file is a word processing document.

25. The method of claim 22, wherein the stub file further includes the link.

26. The method of claim 15, wherein the link is a view link that permits a user to read the uploaded copy of the detected email attachment file without permitting the user to write to or edit the copy of the detected email attachment file.

27. A non-transitory computer-readable storage medium having embodied thereon a computer program executable by a processor to perform a method to process large email attachments during migration, the method comprising:

receiving a first identification of a first server type characterizing a source email platform and a second identification of a second server type characterizing a target email platform;

identifying from the source email platform a plurality of mailboxes, each mailbox including a plurality of emails, and the source email platform including a first attachment size limit stored in a first memory;

inspecting each downloaded mailbox for an email containing an email attachment file, wherein the mailboxes are inspected on a rolling basis as the mailboxes are downloaded from the source email platform;

determining a file size of a detected email attachment file;

comparing the file size of the detected email attachment file to a second attachment size limit;

determining whether a link has previously been generated for a copy of the detected email attachment file, wherein responsive to a determination that the link has previously been generated, no copy of the detected email attachment file is uploaded to a storage server, and wherein responsive to a determination that the link has not previously been generated and responsive to the comparison identifying that the file size of the detected email attachment file exceeds the second attachment size limit stored in a second memory, generating the link, wherein the link permits read access of the detected email attachment file without write or edit permissions, wherein a copy of the detected email attachment file is uploaded to the storage server to be stored, wherein the link includes an HTML link containing a Universal Naming Convention (UNC) path that points to a location of the uploaded copy of the detected email attachment file stored in the storage server;

modifying the email by replacing the detected email attachment file in the email with the link to the copy of the detected email attachment file stored at the storage server, wherein the link provides access to either a read-only version of the detected email attachment file; and migrating the modified email to the target email platform, wherein the read-only version of the detected email attachment file retains an association to the detected email attachment file.

28. The system of claim 1, wherein the link to the copy of the detected email attachment file is encrypted.

\* \* \* \* \*